United States Patent
Totale et al.

(10) Patent No.: US 10,079,831 B1
(45) Date of Patent: Sep. 18, 2018

(54) QUALIFIED WEB APPLICATION SECURITY BASED ON WEB APPLICATION HIERARCHY

(71) Applicant: EMC Corporation, Hopkinton, MA (US)

(72) Inventors: Sachin G Totale, Pleasanton, CA (US); Pawel Zieminski, Pleasanton, CA (US); Julian Hjortshoj, San Francisco, CA (US); Albert Pinto, Pleasanton, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 187 days.

(21) Appl. No.: 15/066,587

(22) Filed: Mar. 10, 2016

(51) Int. Cl.
- *H04L 29/06* (2006.01)
- *G06F 7/04* (2006.01)
- *G06F 15/16* (2006.01)
- *G06F 17/30* (2006.01)

(52) U.S. Cl.
CPC ............ *H04L 63/10* (2013.01); *H04L 63/102* (2013.01); *H04L 63/107* (2013.01)

(58) Field of Classification Search
None
See application file for complete search history.

(56) References Cited

U.S. PATENT DOCUMENTS

| | | | | |
|---|---|---|---|---|
| 2003/0055991 A1* | 3/2003 | Krishnapuram | ........ | G06F 9/468 709/229 |
| 2004/0162905 A1* | 8/2004 | Griffin | ................ | G06F 21/6218 709/229 |
| 2006/0015817 A1* | 1/2006 | Fioretti | ............. | G06F 17/30867 715/765 |
| 2008/0066002 A1* | 3/2008 | Nauerz | ................. | G06F 3/0482 715/762 |
| 2009/0183092 A1* | 7/2009 | Naghshineh | .......... | G06F 9/4443 715/762 |
| 2009/0240935 A1* | 9/2009 | Shukla | ................ | G06F 9/44505 713/100 |
| 2010/0100927 A1* | 4/2010 | Bhola | ................... | G06F 21/335 726/1 |
| 2011/0113353 A1* | 5/2011 | Koh | ....................... | G06F 3/0488 715/760 |
| 2012/0079565 A1* | 3/2012 | Krahulec | .......... | G06F 17/30893 726/3 |
| 2012/0297287 A1* | 11/2012 | Martin | .............. | G06F 17/30861 715/234 |

(Continued)

*Primary Examiner* — Eric Chen
(74) *Attorney, Agent, or Firm* — Dergosits & Noah LLP; Todd A. Noah

(57) ABSTRACT

Qualified web application security based on web application hierarchy is described. A system receives a web application login request from a web browser associated with a user device. The system identifies qualified user information associated with the user device. The system creates an executable file based on applying the qualified user information to a web application hierarchy file comprising hierarchical nodes, wherein each of the hierarchical nodes is associated with a corresponding web application function, at least one corresponding business rule, and a corresponding scope-based security configuration. The system sends the executable file to the web browser, thereby enabling the web browser to apply qualified web application security to requests from the user device for accessing the web application.

20 Claims, 9 Drawing Sheets

(56) References Cited

U.S. PATENT DOCUMENTS

| | | | | |
|---|---|---|---|---|
| 2014/0189778 A1* | 7/2014 | Li | ............................ | H04L 63/20 726/1 |
| 2015/0100600 A1* | 4/2015 | McGee | ............... | G06F 9/44505 707/770 |
| 2015/0356302 A1* | 12/2015 | Simpson | ............... | G06F 21/577 726/25 |

* cited by examiner

- User — 306
  - Authentication
    - Login
    - Logout
  - Preferences — 304
    - View
    - Edit
    - Reset — 302
  - Profile — 310
    - View
    - Edit
    - Create
    - Delete — 308
- Tasks
  - Task List
    - Summary
    - Detailed
  - View
  - Edit
  - Actions
    - Accept
    - Reject
  - Comments
- Document
  - View
  - Edit
  - Download
  - Comments
  - Versions
  - Comments
- Audit Trail
  - User
  - Document
  - Task
- Search — 314
  - Document — 312
  - User — 316

- User
    - Authentication
        - Login
        - Logout
    - Preferences
        - View
        - Edit
        - Reset (only Sliver and Gold Plans)
    - Profile
        - Create
        - View
        - Edit
        - Delete
- Tasks
    - Task List
        - Summary
        - Detailed (only Sliver and Gold Plans)
    - View
    - Edit
    - Actions
        - Accept
        - Reject
        - Comments (only Sliver and Gold Plans)
- Document
    - View
    - Edit
    - Download (only Sliver and Gold Plans)
    - Comments (only Sliver and Gold Plans)
    - Versions (only Gold Plan)
- Audit Trail
    - User (only Gold Plan)
    - Document (only Sliver and Gold Plans)
    - Task (only Sliver and Gold Plans)
- Search
    - Document — 502
    - User (only Gold Plan) — 504
    - Save (only Gold Plan)

FIG. 5

Management Center - application level configuration

```
{
  "id": "mc",
  "scopes": {
    "roles": [
      "deployer",
      "finance_admin",
      "tenant_admin",
      "application_admin",
      "report_admin"
    ],
    "devices": []
  }
}
```

Management Center – Platform module level configuration

```
{
  "id": "mc.platform",
  "Description": "This is the platform management center module",
  "scopes":{
    "roles": [
      "deployer",
      "finance_admin",
      "tenant_admin",
      "report_admin"
    ]
  }
}
```

Management Center – feature level configuration

```
{
  "id" : "mc.platform.application",
  "scopes":{
    "roles":["deployer", "finance_admin"]
  }
}
```
602

Management Center –operation level configuration – create application

FIG. 6

QUALIFIED WEB APPLICATION SECURITY BASED ON WEB APPLICATION HIERARCHY

BACKGROUND

Typically, web application security uses various restrictions and business rules to determine what type of user privileges are required to access various functionalities of a web application. Web application security may be based on various qualifiers, such as a user's assigned role, a user's subscription, a user's device, a user's geographic location, a user's profile, the time of a user's access request, the version of the web application, the client-server environment, the user-requested functionality, the user's service agreement, and the user's tenant in a multi-tenant database system. Traditionally, web application security is a configurable part of implementing a web application. Each web application functionality needs to be configured in a web application security configuration. Any change to a web application's business rules or security needs to be carefully reconfigured to insure that any change is handled properly in each and every part of the web application. When new web application functionalities are added to a web application, corresponding security configurations also need to be added. These requirements may become challenging for cloud-based enterprise software-as-a-service solutions, as each tenant (typically an enterprise company) needs to configure the software-as-a-service based web application security as per the tenant's business practices and type of services.

BRIEF DESCRIPTION OF THE DRAWINGS

FIG. 3 is an example web application hierarchy based on available functionalities per a business use case, under an embodiment;

FIG. 5 is an example web application hierarchy based on subscription-based access to available functionalities per a business use case, under an embodiment;

FIG. 6 is an example of node configurations for a web application hierarchy, under an embodiment;

DETAILED DESCRIPTION

Embodiments herein provide qualified web application security based on web application hierarchy. A system receives a web application login request from a web browser associated with a user device. The system identifies qualified user information associated with the user device. The system creates an executable file based on applying the qualified user information to a web application hierarchy file which includes hierarchical nodes which are associated with corresponding web application functions, corresponding business rules, and corresponding scope-based security configurations. The system sends the executable file to the web browser, which enables the web browser to apply qualified web application security to requests from the user device for accessing the web application.

For example, a web application security tool receives a request to login to a document task management business application from a user via a desktop personal computer. The web application security tool identifies that the user is assigned an author role. The web application security tool applies the author role to the corresponding business rules and the corresponding scope-based security configurations for the hierarchical nodes in a web application hierarchy file to create a qualified web application hierarchy file. The qualified web application hierarchy file specifies that the user has access to a basic functionality to search for documents because the business rules specify that this basic functionality is available for users associated with the author role, but the qualified web application hierarchy file does not specify that the user has access to a premium functionality to search for other users because the business rules specify that this premium functionality is not available for users associated with the author role. The web application security tool creates an executable file based on the qualified web application hierarchy file, and sends the executable file to the desktop personal computer's web browser, which executes this executable file to provide the user with access to the document task management business application's basic functionality to search for documents. However, the web browser does not provide the user with access to the document task management business application's premium functionality to search for other users.

Figure 1:
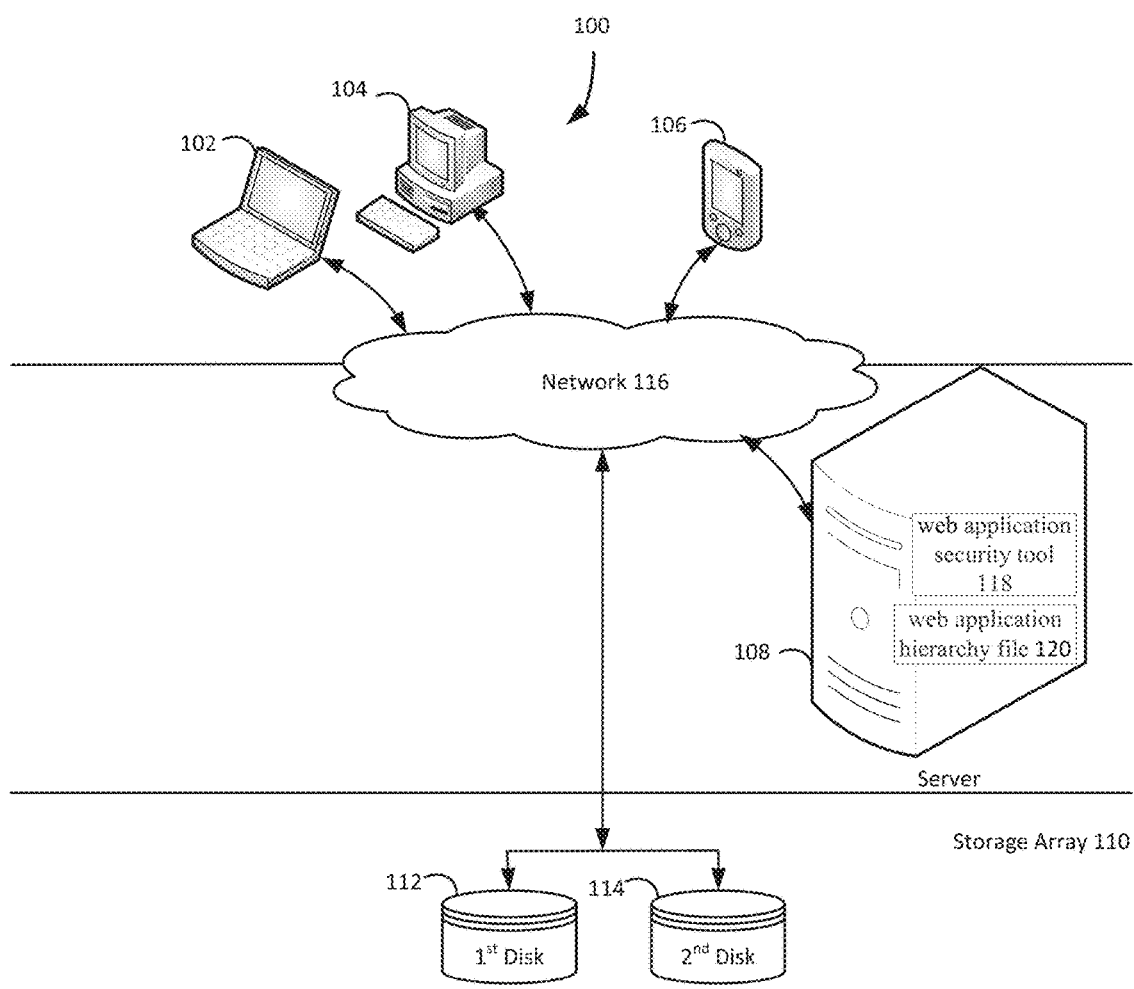
FIG. 1 illustrates a block diagram of an example system for qualified web application security based on web application hierarchy, under an embodiment.

Prior to describing the subject matter in detail, an exemplary hardware system in which the subject matter may be implemented is described. Those of ordinary skill in the art will appreciate that the elements illustrated in FIG. 1 may vary depending on the system implementation. FIG. 1 illustrates a diagram of a system that implements qualified web application security based on web application hierarchy, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 and a storage array 110 that may be provided by a hosting company. Although FIG. 1 depicts the first client 102 as a laptop computer 102, the second client 104 as a personal computer 104, and the third client 106 as a personal digital assistant 106, each of the clients 102-106 may be any type of computer. The storage array 110 includes a first disk 112 and a second disk 114. The clients 102-106, the server 108, and the storage array 110 communicate via a network 116. The server 108 includes a web application security tool 118 which accesses a web application hierarchy file 120 in the server 108 to provide qualified web application security based on web application hierarchy, as described below.

Although FIG. 1 depicts the system 100 with three clients 102-106, one server 108, one storage array 110, two disks 112-114, and one network 116, the system 100 may include any number of clients 102-106, any number of servers 108, any number of storage arrays 110, any number of disks 112-114, and any number of networks 116. The clients 102-106 and the server 108 may each be substantially similar to the system 900 depicted in FIG. 9 and described below.

Figure 2:
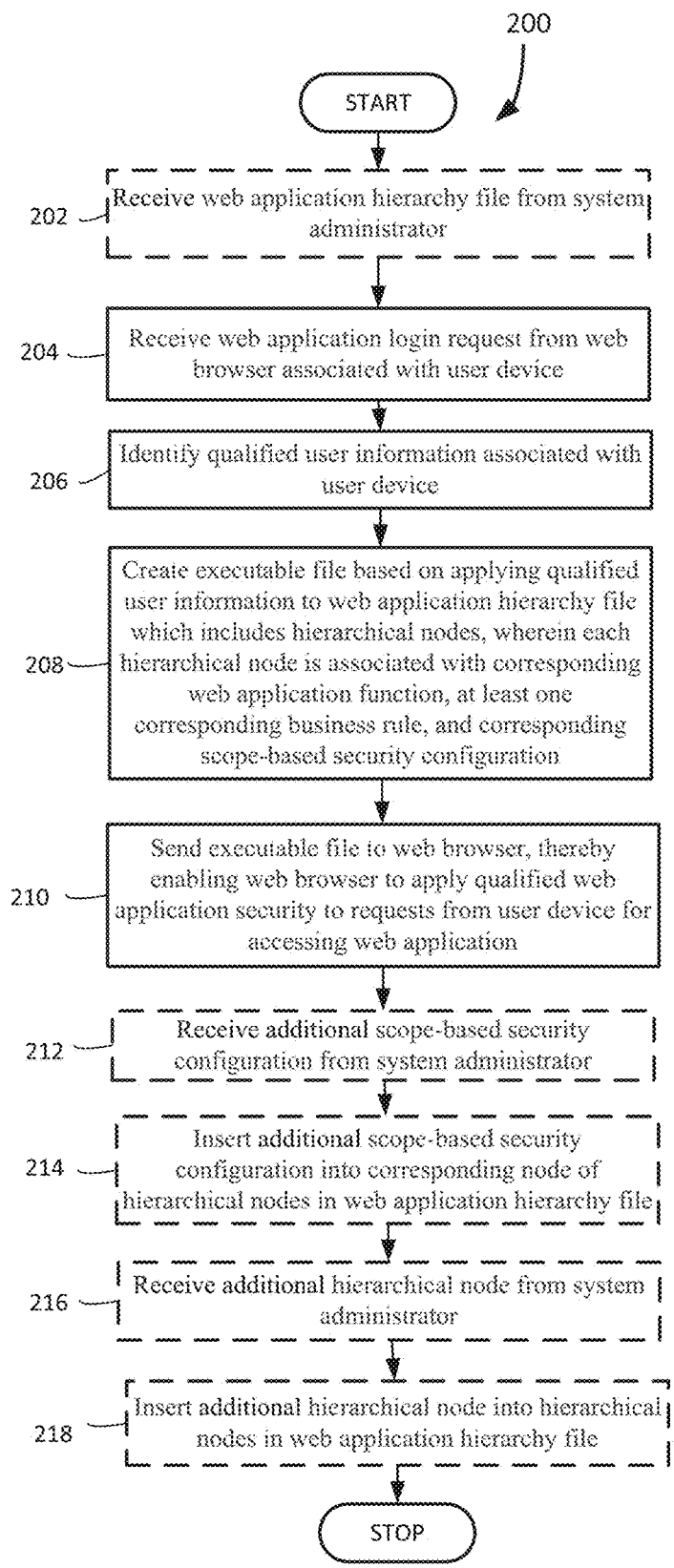
FIG. 2 is an example flow chart illustrating a process for qualified web application security based on web application hierarchy, under an embodiment.

FIG. 2 is a flowchart that illustrates a method for qualified web application security based on web application hierarchy, under an embodiment. Flowchart 200 illustrates method acts illustrated as flowchart blocks for certain steps involved in and/or between the clients 102-106 and/or the server 108 of FIG. 1.

Figure 4:
FIG. 4 is an example web application hierarchy based on role-based access to available functionalities per a business use case, under an embodiment.

A web application hierarchy file is optionally received from a system administrator, block 202. For example, a system administrator sends the web application hierarchy file 120 for a document task management business application to the web application security tool 118. In this example, the document task management business application manages end-user tasks, enables end-users to perform various actions on assigned tasks associated with business documents, and maintains an audit trail of all actions performed on the tasks and the documents. The web application hierarchy file 120 may be organized in any logical manner, such as based on folders, configurations, or data. Although this example describes the web application hierarchy file 120 for the document task management business application, the web application hierarchy file 120 may be for any type of web application. An example of a web application hierarchy 300 based on the document task management business application is depicted in FIG. 3 and described below in reference to FIG. 3. Access to the functionalities represented by the web application hierarchy file 120 may be based on a user's role, the user's subscription, the user's device, the user's location, the user's profile, a time of the user's access request, a version of the web application, a client-server environment, the user's requested functionality, the user's service agreement, and/or the user's tenant in a multi-tenant database system. An example of a web application hierarchy 400 based on role-based access to the document task management business application is depicted in FIG. 4 and described below in reference to FIG. 4. An example of a web application hierarchy 500 based on subscription-based access to the document task management business application is depicted in FIG. 5 and described below in reference to FIG. 5. An example of node configurations 600 for a web application hierarchy is depicted in FIG. 6 and described below in reference to FIG. 6.

After receiving a web application hierarchy file, a web application login request for the corresponding web application is subsequently received from a web browser associated with a user device, block 204. For example, the web application security tool 118 receives a request to login to the document task management business application from a user via the desktop personal computer 104. In another example, the web application security tool 118 receives another request to login to the document task management business application from another user via the mobile device 106.

Having received a request from a user device, qualified user information associated with the user device is identified, block 206. For example, the web application security tool 118 identifies that the user who is requesting to login via the desktop personal computer 104 is assigned an author role and is an employee of an employer which is subscribed via a basic subscription. In another example, the web application security tool 118 identifies that the user who is requesting to login via the mobile device 106 is assigned an approver role and is an employee of an employer which is subscribed via a premium subscription. Although these examples describe qualified user information based on a user role and a subscription, the qualified user information may be based on a user's role, the user's subscription, the user's device, the user's location, the user's profile, a time of the user's access request, a version of the web application, a client-server environment, the user's requested functionality, the user's service agreement, and/or the user's tenant in a multi-tenant database system. The web application security tool 118 may use the type of the requesting user device, including screen orientation, browser type, and language, as qualified user information. The web application security tool 118 may use such qualified user information to change the page layout and content displayed, adjust user navigation, and/or make some functionalities unavailable for user devices with relatively smaller display screens. The web application security tool 118 may also use the time of the user's access request, such as the time of day, the day of a week or a month, or the month in a year, as qualified user information.

Figure 7:
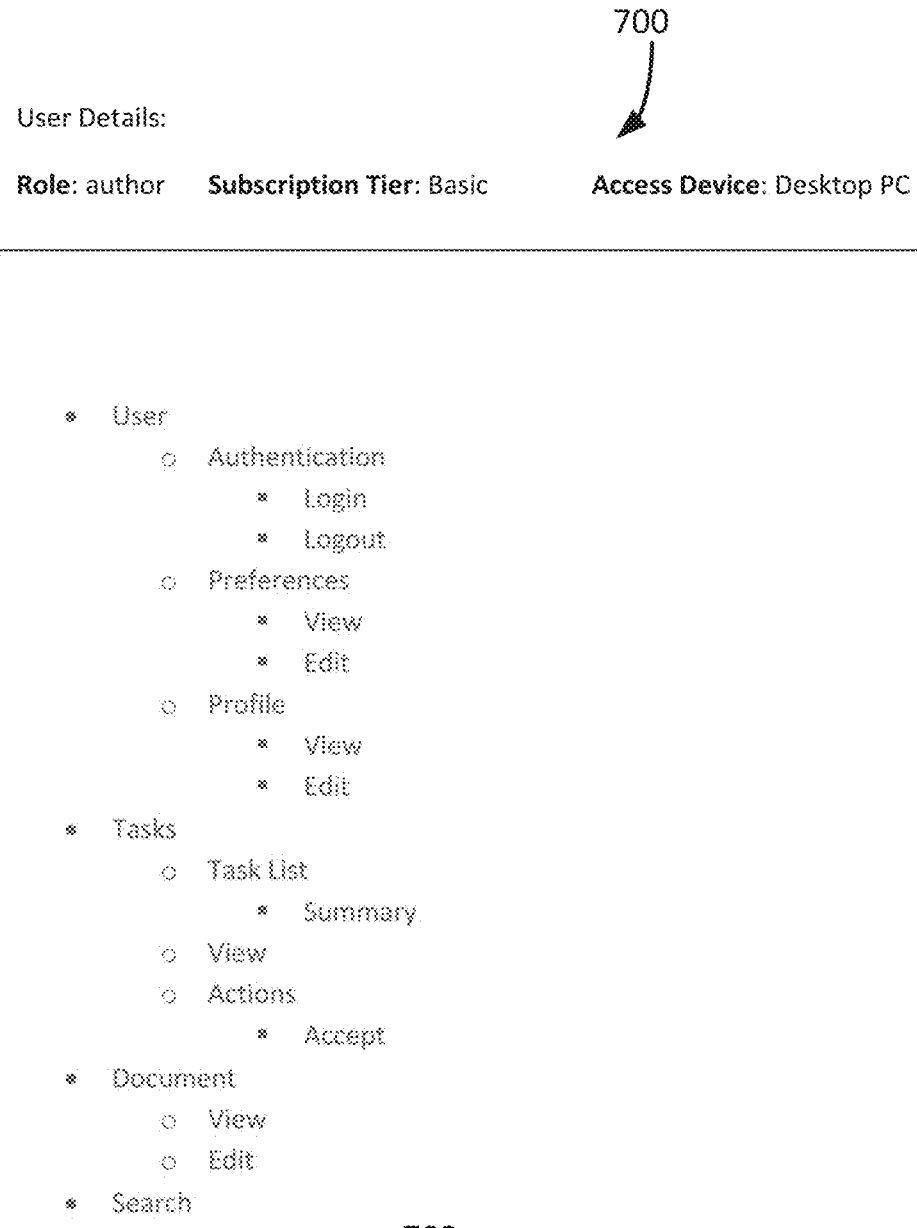
FIG. 7 is an example qualified web application hierarchy, under an embodiment.

After identifying qualified user information, an executable file is created based on applying the qualified user information to a web application hierarchy file which includes hierarchical nodes, wherein each hierarchical node is associated with a corresponding web application function, at least one corresponding business rule, and a corresponding scope-based security configuration, block 208. For example, the web application security tool 118 applies the qualified user information specifying the author role, the basic subscription, and the desktop personal computer 104 to the corresponding business rules and the corresponding scope-based security configurations for the web application hierarchy file 120 to create a qualified web application hierarchy file. An example qualified web application hierarchy 700 based on an author role, a basic subscription, and a desktop personal computer is depicted in FIG. 7 and described below in reference to FIG. 7. This qualified web application hierarchy file 700 specifies that the corresponding user has access to a basic functionality to search for documents 702 because the business rules 402 and 502 depicted in FIG. 4 and FIG. 5 specify that this basic functionality is available for users associated with the author role and a basic subscription. However, this qualified web application hierarchy file 700 does not specify that the corresponding user has access to a premium functionality to search for other users because the business rules 404 and 504 depicted in FIG. 4 and FIG. 5 specify that this premium functionality is not available for users associated with the author role and a basic subscription. Then the web application security tool 118 creates an executable file based on the qualified web application hierarchy file 700 which is based on the qualified user information specifying the author role, the basic subscription, and the desktop personal computer 1104.

Figure 8:
FIG. 8 is another example qualified web application hierarchy, under an embodiment.

In another example, the web application security tool 118 applies the qualified user information specifying the approver role, the premium subscription, and the mobile device 106 to the corresponding business rules and the corresponding scope-based security configurations for the web application hierarchy file 120 to create another qualified web application hierarchy file. An example qualified web application hierarchy 800 based on an approver role, a premium subscription, and a mobile device is depicted in FIG. 8 and described below in reference to FIG. 8. This qualified web application hierarchy file 800 specifies that the corresponding user also has access to the basic functionality to search for documents 802 because the business rules 402 and 502 depicted in FIG. 4 and FIG. 5 specify that this basic functionality is available for users associated with the approver role and a premium subscription. Additionally, this qualified web application hierarchy file 800 specifies that the corresponding user also has access to a premium functionality to search for other users 804 because the business rules 404 and 504 depicted in FIG. 4 and FIG. 5 specify that this premium functionality is available for users associated with the approver role and a premium subscription. Then the web application security tool 118 creates another executable file based on the qualified web application hierarchy file 800 which is based on the qualified user information specifying the approver role, the premium subscription, and the mobile device 106.

A web application is able to use a well-defined identifier for each node in the web application hierarchy 120 in a manner similar to the selection of Cascading Style Sheets (CSS) in Hyper Text Markup Language (HTML) Domain Object Models (DOM) to hide/show or skip/render the corresponding portion of the HTML code. This mechanism also enables application developers to have a clear separation of application security from core application business logic.

Having created an executable file, the executable file is sent to a web browser, thereby enabling the web browser to apply qualified web application security to requests from a user device for accessing a web application, block 210. For example, the web application security tool 118 sends the executable file based on the qualified web application hierarchy file 700 which is based on the qualified user information specifying the author role, the basic subscription, and the desktop personal computer 104 to the web browser of the desktop personal computer 104. When the web browser of the desktop personal computer 104 executes this executable file, this web browser provides the corresponding user with access to the document task management business application's basic functionality to search for documents 702, but does not provide the corresponding user with access to the document task management business application's premium functionality to search for other users.

In another example, the web application security tool 118 sends the executable file based on the qualified web application hierarchy file 800 which is based on the qualified user information specifying the approver role, the premium subscription, and the mobile device 106 to the web browser of the mobile device 106. When the web browser of the mobile device 106 executes this executable file, this web browser provides the corresponding user with access to the document task management business application's basic functionality to search for documents 802 and to the document task management business application's premium functionality to search for other users 804.

After enabling qualified web application security, an additional scope-based security configuration is optionally received from a system administrator, block 212. For example, a system administrator submits an additional security configuration and business rule for the previously existing functionality to delete a user profile 406, wherein this additional security configuration is scoped for access by the system administrator, as depicted in FIG. 4, because too many users have inadvertently deleted their user profile. This previously existing functionality to delete a user profile 406 had been previously associated with the security configuration for user profiles, which was inherited from the user profile parent node 408 for the user profile delete child node 406, and which was scoped for access by the corresponding user, as depicted in FIG. 4. The structure of the web application hierarchy 120 enabled the user profile delete child node 406 to inherit a default security configuration from the user profile parent node 408 without requiring any system administrator to individually configure the security configuration for the user profile delete child node 406. Similarly, any changes to business rules and/or security configuration for a node is automatically inherited as default values by the node's descendent nodes unless explicitly specified otherwise.

Having received an additional scope-based security configuration, the additional scope-based security configuration is optionally inserted into a corresponding hierarchical node in a web application hierarchy file, block 214. For example, the web application security tool 118 inserts this additional security configuration for the functionality to delete a user profile, scoped for access by the system administrator, into the user profile delete node 406 of the example web application hierarchy file 400, as depicted in FIG. 4. Continuing this example, any subsequent login requests result in web browsers executing executable files which provide access only to the system administrator to the functionality to delete a user profile 406. The web application security tool 118 enables the system administrator to transparently inject additional security into a group of functionalities in the web application hierarchy 120. The structure of the web application hierarchy 120 enables a system administrator to set the security for a group of functionalities based on a common security configuration set at an ancestor node, such that a system administrator can set security for a web application without a great amount of detailed technical knowledge.

After enabling qualified web application security, an additional hierarchical node is optionally received from a system administrator, block 216. For example, a system administrator submits an additional node for an additional functionality to reset a user's preferences, wherein the corresponding security configuration is scoped for access by the system administrator, because many users have requested the system administrator to reset their user preferences.

Having received an additional hierarchical node, the additional hierarchical node is optionally inserted into the hierarchical nodes in a web application hierarchy file, block 218. For example, the web application security tool 118 inserts this additional node for the functionality to reset a user preference, scoped for access by the system administrator, as a user preferences reset child node 410 for the user preferences parent node 412 in the example web application hierarchy file 400, as depicted in FIG. 4. Continuing this example, a system administrator can respond to any subsequent requests to reset user preferences by logging into the document task management business application, which results in the system administrator's web browser executing an executable file which provides access to the functionality to reset a user preference 410. The structure of the web application hierarchy 120 enables any node added as a child node to inherit a default security configuration from the added node's parent node without requiring any system administrator to individually configure the security configuration for the added node. If the web application security tool 118 receives a request from a user administrator to add a child node for the user preferences reset node 410, this new child node would automatically inherit the default security configuration of its parent node 410 and only be accessible by the system administrator, unless explicitly specified otherwise. The structure of the web application hierarchy 120 enables the easy addition, deletion, and modification of functionalities, business rules, and security configurations through the addition, deletion, and modification of corresponding nodes.

Although FIG. 2 depicts the blocks 202-218 occurring in a specific order, the blocks 202-218 may occur in another order. In other implementations, each of the blocks 202-218 may also be executed in combination with other blocks and/or some blocks may be divided into a different set of blocks.

FIG. 3 is an example web application hierarchy 300 based on available functionalities per a business use case, under an embodiment. The example web application hierarchy 300 includes the node representing the functionality to reset user preferences 302, which is depicted as a child node of the user preferences parent node 304, which is depicted as a child node of the user parent node 306. The example web application hierarchy 300 also includes the node representing the functionality to delete a user profile 308, which is depicted as a child node of the user profile parent node 310, which is depicted as a child node of the user parent node 306. The example web application hierarchy 300 further includes the node representing the functionality to search for a document 312, which is depicted as a child node of the search parent node 314. The example web application hierarchy 300 additionally includes the node representing the functionality to search for a user 316, which is depicted as a child node of the search parent node 314.

FIG. 4 is an example web application hierarchy 400 based on role-based access to available functionalities per a business use case, under an embodiment. The document task management business application represented by the web application hierarchy 400 may have four user roles, such as an author, a reviewer, an approver, and a system administrator. More than one author may be associated with each reviewer, and more than one reviewer may be associated with each approver. The business rule 402 specifies that the basic functionality to search for documents is available for all users, including users associated with the author role and users associated with the approver role. The business rule 404 specifies that the premium functionality premium functionality to search for other users is not available for users associated with the author role, but is available for users associated with the reviewer role or the approver role. The web application hierarchy 400 includes the node representing the functionality to delete a user profile 406, which is depicted as a child node of the user profile parent node 408, and the node representing the functionality to rest user preferences 410, which is depicted as a child node of the user preferences node 412. Although the business rules 402 and 404 are depicted as annotations to their corresponding nodes, the business rules may be indicated in any manner.

FIG. 5 is an example web application hierarchy 500 based on subscription-based access to available functionalities per a business use case, under an embodiment. The document task management business application represented by the web application hierarchy 500 may have three subscription plans, such as a basic plan, a silver plan, and a gold plan. The business rule 502 specifies that the basic functionality to search for documents is available for all users, including users associated with a basic subscription plan and for users associated with the premium silver and gold subscription plans. The business rule 504 specifies that the premium functionality premium functionality to search for other users is not available for users associated with a basic subscription plan, but is available for users associated with the premium silver and gold subscription plans. Although the business rules 502 and 504 are depicted as annotations to their corresponding nodes, the business rules may be indicated in any manner.

FIG. 6 is an example of node configurations 600 for a web application hierarchy, under an embodiment. For example, the node configuration for the functionality to create an application is scoped to the role of a deployer 602.

FIG. 7 is an example qualified web application hierarchy 700 based on an author role, a basic subscription, and a desktop personal computer, under an embodiment. This qualified web application hierarchy file 700 specifies that a corresponding user has access to a basic functionality to search for documents 702 because the business rules 402 and 502 depicted in FIG. 4 and FIG. 5 specify that this basic functionality is available for users associated with the author role and a basic subscription. A web browser provides the corresponding user with access to the document task management business application's basic functionality to search for documents 702, but does not provide the corresponding user with access to the document task management business application's premium functionality to search for other users.

FIG. 8 is an example qualified web application hierarchy 800 based on a reviewer role, a gold subscription, and a mobile device, under an embodiment. This qualified web application hierarchy file 800 specifies that a corresponding user has access to the basic functionality to search for documents 802 because the business rules 402 and 502 depicted in FIG. 4 and FIG. 5 specify that this basic functionality is available for users associated with the approver role and a premium subscription. Additionally, this qualified web application hierarchy file 800 specifies that the corresponding user also has access to a premium functionality to search for other users 804 because the business rules 404 and 504 depicted in FIG. 4 and FIG. 5 specify that this premium functionality is available for users associated with the approver role and a premium subscription. A web browser provides the corresponding user with access to the document task management business application's basic functionality to search for documents 802 and to the document task management business application's premium functionality to search for other users 804.

Figure 9:
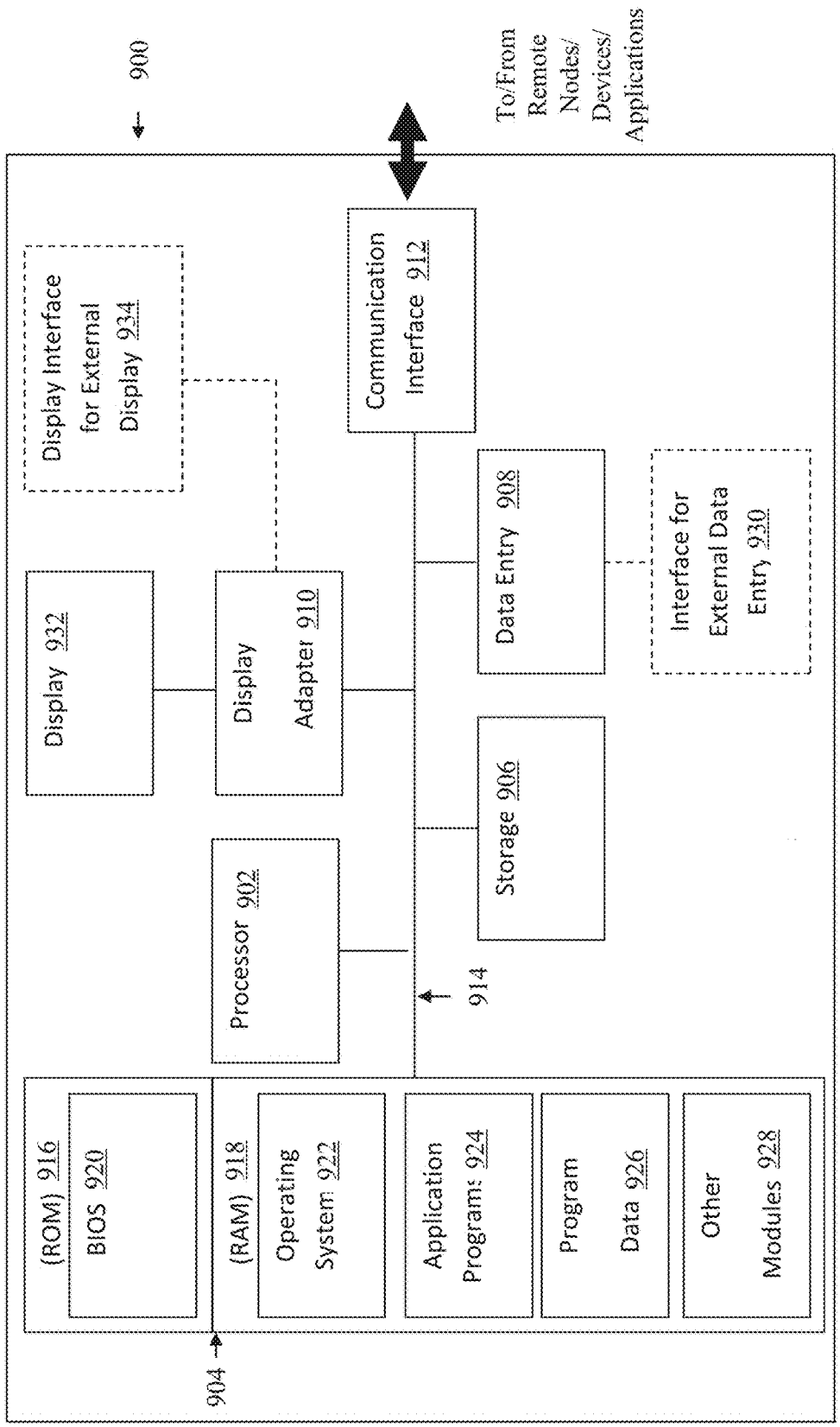
FIG. 9 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 9 may vary depending on the system implementation. With reference to FIG. 9, an exemplary system for implementing the subject matter disclosed herein includes a hardware device 900, including a processing unit 902, memory 904, storage 906, a data entry module 908, a display adapter 910, a communication interface 912, and a bus 914 that couples the elements 904-912 to the processing unit 902.

The bus 914 may comprise any type of bus architecture. Examples include a memory bus, a peripheral bus, a local bus, etc. The processing unit 902 is an instruction execution machine, apparatus, or device and may comprise a microprocessor, a digital signal processor, a graphics processing unit, an application specific integrated circuit (ASIC), a field programmable gate array (FPGA), etc. The processing unit 902 may be configured to execute program instructions stored in the memory 904 and/or the storage 906 and/or received via the data entry module 908.

The memory 904 may include read only memory (ROM) 916 and random access memory (RAM) 918. The memory 904 may be configured to store program instructions and data during operation of the hardware device 900. In various embodiments, the memory 904 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 904 may also include nonvolatile memory technologies such as nonvolatile flash RAM (NVRAM) or ROM. In some embodiments, it is contemplated that the memory 904 may include a combination of technologies such as the foregoing, as well as other technologies not specifically mentioned. When the subject matter is implemented in a computer system, a basic input/output system (BIOS) 920, containing the basic routines that help to transfer information between elements within the computer system, such as during start-up, is stored in the ROM 916.

The storage 906 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 900.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 906, the ROM 916 or the RAM 918, including an operating system 922, one or more applications programs 924, program data 926, and other program modules 928. A user may enter commands and information into the hardware device 900 through the data entry module 908. The data entry module 908 may include mechanisms such as a keyboard, a touch screen, a pointing device, etc. Other external input devices (not shown) are connected to the hardware device 900 via an external data entry interface 930. By way of example and not limitation, external input devices may include a microphone, joystick, game pad, satellite dish, scanner, or the like. In some embodiments, external input devices may include video or audio input devices such as a video camera, a still camera, etc. The data entry module 908 may be configured to receive input from one or more users of the hardware device 900 and to deliver such input to the processing unit 902 and/or the memory 904 via the bus 914.

A display 932 is also connected to the bus 914 via the display adapter 910. The display 932 may be configured to display output of the hardware device 900 to one or more users. In some embodiments, a given device such as a touch screen, for example, may function as both the data entry module 908 and the display 932. External display devices may also be connected to the bus 914 via an external display interface 934. Other peripheral output devices, not shown, such as speakers and printers, may be connected to the hardware device 900.

The hardware device 900 may operate in a networked environment using logical connections to one or more remote nodes (not shown) via the communication interface 912. The remote node may be another computer, a server, a router, a peer device or other common network node, and typically includes many or all of the elements described above relative to the hardware device 900. The communication interface 912 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 912 may include logic configured to support direct memory access (DMA) transfers between the memory 904 and other devices.

In a networked environment, program modules depicted relative to the hardware device 900, or portions thereof, may be stored in a remote storage device, such as, for example, on a server. It will be appreciated that other hardware and/or software to establish a communications link between the hardware device 900 and other devices may be used.

It should be understood that the arrangement of the hardware device 900 illustrated in FIG. 9 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 900.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 9.

Other components may be implemented in software, hardware, or a combination of software and hardware.

Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for qualified web application security based on web application hierarchy, the system comprising:
   a hardware processor; and
   a processor-based application, which when executed by the hardware processor, will cause the processor to:
   receive a web application login request from a web browser associated with a user device;
   identify qualified user information associated with the user device;
   create an executable file based on applying the qualified user information to a web application hierarchy file comprising a plurality of hierarchical nodes, wherein each of the plurality of hierarchical nodes is associated with a corresponding web application function, at least one corresponding business rule, and a corresponding scope-based security configuration; and
   send the executable file to the web browser, thereby enabling the web browser to apply qualified web application security to requests from the user device for accessing the web application.

2. The system of claim 1, wherein the qualified user information is based on at least one of a user role, a subscription, the user device, a geographic location associated with the user device, a user profile, a time of an access request, a version of the web application, a client-server environment, a user-requested functionality, a service agreement, and a tenant associated with a multi-tenant database system.

3. The system of claim 1, wherein creating the executable file comprises creating a qualified web application hierarchy file based on the qualified user information and creating the executable file is based on the qualified web application hierarchy file.

4. The system of claim 1, wherein applying the qualified web application security to requests from the user device for accessing the web application comprises disabling access to a child node associated with the web application hierarchy file in response to a determination that access is disabled to an ancestor node associated with the child node.

5. The system of claim 1, wherein the processor-based application is further configured to receive the web application hierarchy file from a system administrator.

6. The system of claim 1, wherein the processor-based application is further configured to:
   receive an additional scope-based security configuration from a system administrator; and
   insert the additional scope-based security configuration into a corresponding node of the plurality of hierarchical nodes in the web application hierarchy file.

7. The system of claim 1, wherein the processor-based application is further configured to:
   receive an additional hierarchical node from a system administrator; and
   insert the additional hierarchical node into the plurality of hierarchical nodes in the web application hierarchy file.

8. A computer-implemented method for qualified web application security based on web application hierarchy, the method comprising:
   receiving a web application login request from a web browser associated with a user device;
   identifying qualified user information associated with the user device;
   creating an executable file based on applying the qualified user information to a web application hierarchy file comprising a plurality of hierarchical nodes, wherein each of the plurality of hierarchical nodes is associated with a corresponding web application function, at least one corresponding business rule, and a corresponding scope-based security configuration; and
   sending the executable file to the web browser, thereby enabling the web browser to apply qualified web application security to requests from the user device for accessing the web application.

9. The method of claim 8, wherein the qualified user information is based on at least one of a user role, a subscription, the user device, a geographic location associated with the user device, a user profile, a time of an access request, a version of the web application, a client-server environment, a user-requested functionality, a service agreement, and a tenant associated with a multi-tenant database system.

10. The method of claim 8, wherein creating the executable file comprises creating a qualified web application hierarchy file based on the qualified user information and creating the executable file is based on the qualified web application hierarchy file.

11. The method of claim 8, wherein applying the qualified web application security to requests from the user device for accessing the web application comprises disabling access to a child node associated with the web application hierarchy file in response to a determination that access is disabled to an ancestor node associated with the child node.

12. The method of claim 8, wherein the method further comprises receiving the web application hierarchy file from a system administrator.

13. The method of claim 8, wherein the method further comprises:
   receiving an additional scope-based security configuration from a system administrator;
   inserting the additional scope-based security configuration into a corresponding node of the plurality of hierarchical nodes in the web application hierarchy file;
   receiving an additional hierarchical node from a system administrator; and
   inserting the additional hierarchical node into the plurality of hierarchical nodes in the web application hierarchy file.

14. A computer program product, comprising a non-transitory computer-readable medium having a computer-readable program code embodied therein to be executed by one or more processors, the program code including instructions to:
   receive a web application login request from a web browser associated with a user device;
   identify qualified user information associated with the user device;
   create an executable file based on applying the qualified user information to a web application hierarchy file comprising a plurality of hierarchical nodes, wherein each of the plurality of hierarchical nodes is associated with a corresponding web application function, at least one corresponding business rule, and a corresponding scope-based security configuration; and
   send the executable file to the web browser, thereby enabling the web browser to apply qualified web application security to requests from the user device for accessing the web application.

15. The computer program product of claim 14, wherein the qualified user information is based on at least one of a user role, a subscription, the user device, a geographic location associated with the user device, a user profile, a time of an access request, a version of the web application, a client-server environment, a user-requested functionality, a service agreement, and a tenant associated with a multi-tenant database system.

16. The computer program product of claim 14, wherein creating the executable file comprises creating a qualified web application hierarchy file based on the qualified user information and creating the executable file is based on the qualified web application hierarchy file.

17. The computer program product of claim 14, wherein applying the qualified web application security to requests from the user device for accessing the web application comprises disabling access to a child node associated with the application hierarchy file in response to a determination that access is disabled to an ancestor node associated with the child node.

18. The computer program product of claim 14, wherein the program code includes further instructions to receive the web application hierarchy file from a system administrator.

19. The computer program product of claim 14, wherein the program code includes further instructions to:
   receive an additional scope-based security configuration from a system administrator; and
   insert the additional scope-based security configuration into a corresponding node of the plurality of hierarchical nodes in the web application hierarchy file.

20. The computer program product of claim 14, wherein the program code includes further instructions to:
   receive an additional hierarchical node from a system administrator; and
   insert the additional hierarchical node into the plurality of hierarchical nodes in the web application hierarchy file.

* * * * *